May 5, 1959
A. M. SPIELBERG
2,885,659
ELECTRONIC LIBRARY SYSTEM
Filed Sept. 22, 1954
2 Sheets-Sheet 1
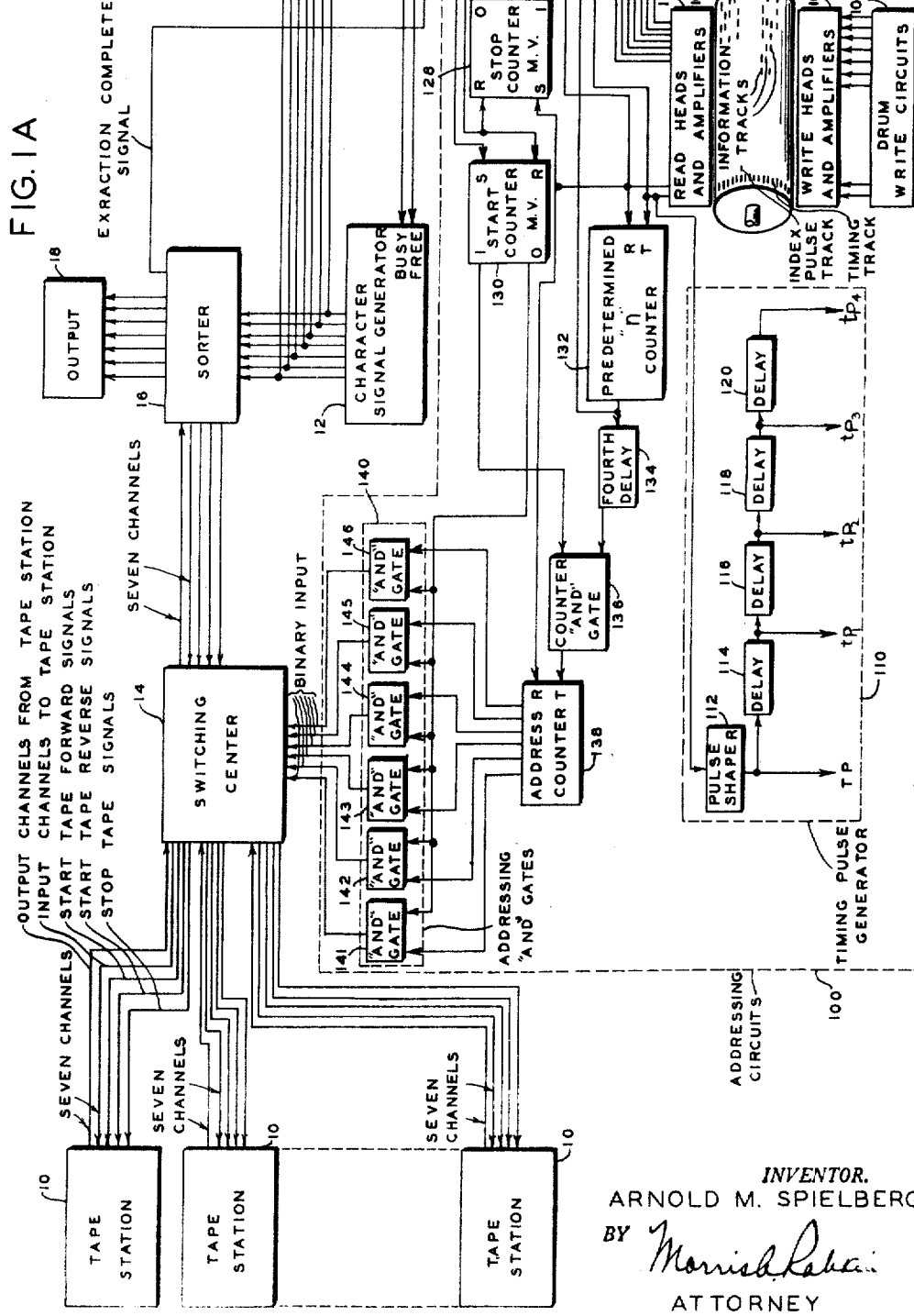
FIG. IA
INVENTOR.
ARNOLD M. SPIELBERG
BY
ATTORNEY

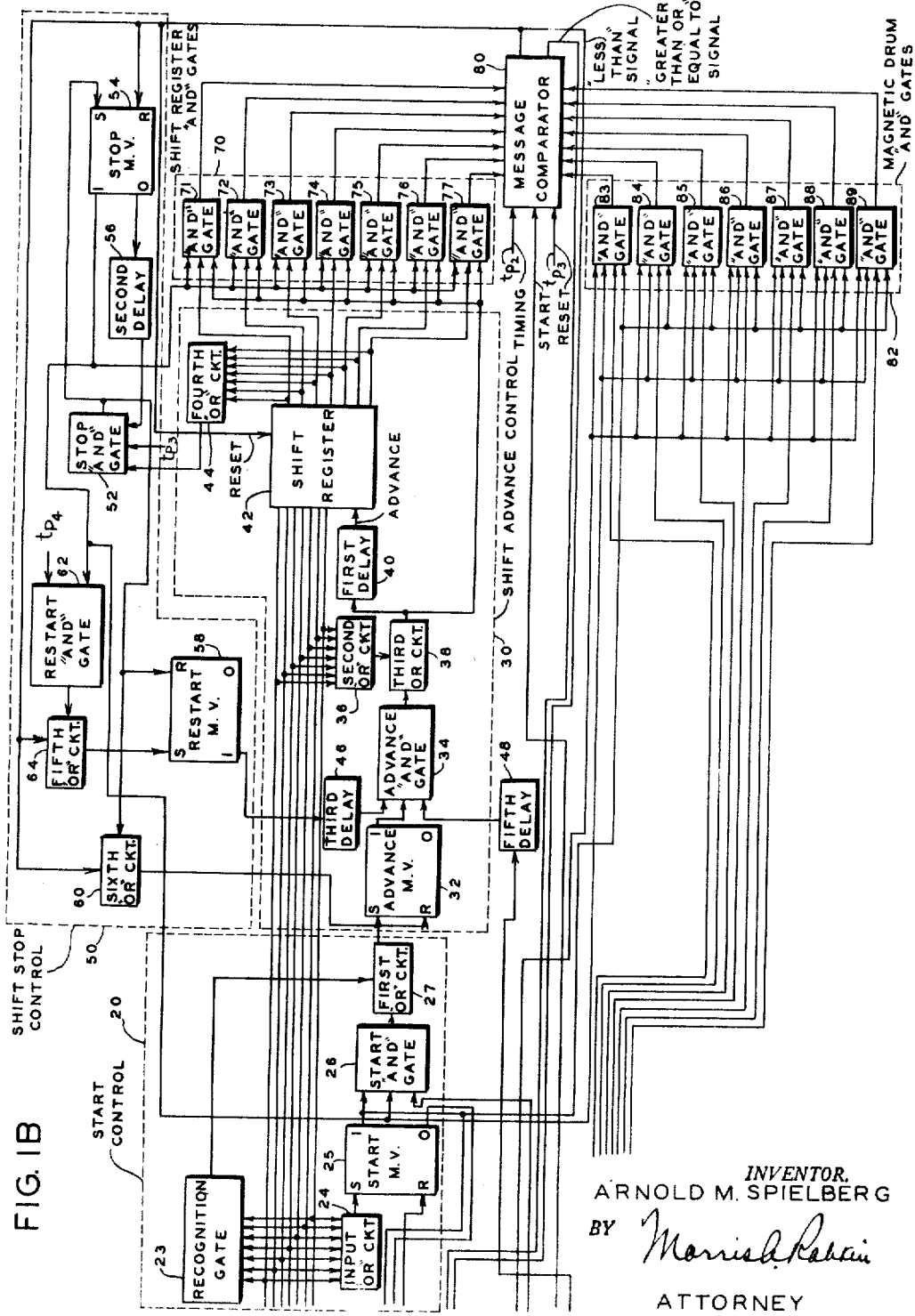

United States Patent Office 2,885,659
Patented May 5, 1959

2,885,659

ELECTRONIC LIBRARY SYSTEM

Arnold M. Spielberg, Haddonfield, N.J., assignor to Radio Corporation of America, a corporation of Delaware Application September 22, 1954, Serial No. 457,719

11 Claims. (Cl. 340—174)

This invention relates to information handling systems, and particularly to an electronic system for interrogating a library or information storage system.

The development of high-speed data-processing systems, such as computers, has made possible the application of electronic techniques to the problem of storage and selection of information. Large masses of data may be compactly and permanently stored on mediums such as magnetic tape. Information may be recorder on and reproduced from such mediums cheaply and rapidly. The form in which the information is preserved may be an alpha-numeric binary code, various types of which are presently employed in computers and other information handling systems.

An installation (that is, an arrangement) which stores large masses of information for future access may be descriptively termed a library. For large information storing capacity such an installation may employ a large number of magnetic tape stations. To use the information in a number of operations the installation may also include a sorting device. Easy access to the stored information, and ready and rapid selection of particular stored information are highly desirable.

The library may catalogue, for example, stock quotation, ticket reservation, and inventory control systems. Most of these systems operate in predetermined cycles, deriving information from and supplying information to, a synchronous storage medium, such as, for example, a magnetic drum. The use of a synchronous storage medium, however, imposes severe limitations on the capacity of the system for storing information, as well as on the form in which the information can be stored. Computers themselves can be employed for the extraction of information, but computers ordinarily are not specially designed for this purpose. Computers are ordinarily more general purpose machines. For this reason, the required computer programs for information extraction usually are long and complex, even though only a portion of the computer system may be utilized in the operation.

It is extremely important in respect of cost and flexibility, when storing large masses of information, to store the information as compactly as possible. Considerable space may be wasted, and considerable expense may result, if information groupings are allotted uniform storage space. For example, if names are recorded in sequence on magnetic tape, and each name is placed within an allotted space sufficiently long to hold the longest expected name, the average name will not use a considerable portion of the allotted space. If the names are packed closely together, however, the problems involved in distinguishing and selecting a particular name become more difficult than with the uniform allotted spaces.

Therefore, it is an object of this invention to provide a novel system for selecting information from a plurality of storage devices.

A further object of this invention is to provide a novel system for manually locating information stored in variable length form on one of a number of magnetic tapes.

Another object of this invention is to provide an improved system for providing access to stored information, which system has a capacity greatly in excess of the systems of the prior art.

Yet another object of this invention is to provide an improved system for manually locating information stored at one of a number of asynchronously operated storage stations, the system to operate simply, rapidly, and flexibly.

A further object of this invention is to provide a novel reference system operable with a number of asynchronous storage stations and including the features of manual control, high capacity, and ready access.

Another object of this invention is to provide a novel system for selecting information from an electronic library, said system manipulating alphabetic or numeric information and synchronizing the operation of a number of units having widely differing speeds.

In accordance with the invention, desired information may be selected from information stored on a number of magnetic tapes. The stored information is kept in order on each of the various tapes. A key segment from the first information grouping on each tape is stored on a magnetic drum. These key segments are all of the same length and are arranged on the drum in a sequence corresponding to the tape stations in which they are to be found. Another key segment, pertinent information as to which is to be extracted, may be provided as input to the interrogation system and simultaneously to the sorting system. To select the tape in which the desired information is to be found, the key input is placed in a shift register. The arrangement of the key input in the shift register corresponds to the arrangement of the key segments on the magnetic drum. The key input and the stored key segments are individually and successively compared during a single revolution of the magnetic drum. When a predetermined relationship is detected between the key input and one of the stored key segments the proper tape station is indicated and connected to the sorting system. The sorter then extracts the desired information grouping from within the tape.

The novel features of the invention, as well as the invention itself, both as to its organization and method of operation, will best be understood from the following description, when read in connection with the accompanying drawing, in which like reference numerals refer to like parts, and in which Fig. 1 is a block diagram of an arrangement for practicing the invention, comprising two sheets of drawings, denoted as Figs. 1A and 1B, which are to be placed side by side with Fig. 1A at the left for viewing the drawing as a whole.

THE SYSTEM

A number of similar magnetic tape stations 10 (Fig. 1A), such as are presently employed in computers, may be used as the storage. In the present example, information is assumed to be placed in order on the tape at each station 10 and from station to station. All information pertinent to a particular subject may be grouped together, but only a particular portion of each grouping may be used to determine rankings within the sequence. For example, a large mass of census information may be gathered for each individual of a population, but when stored in this form of electronic library the listing may be by name and address. The name and address is therefore one form of key, or serial number, by which the information may be classified.

The form in which the information is preserved is assumed to be a multi-digit binary code of the alphanumeric type. Such codes are employed in modern data-processing machines. In such a code, groupings of binary-valued representations or signals may represent numbers, letters, and special symbols. The special symbols may separate, for example, units of information (such as characters) into items (such as words) and items into messages. By use of the special symbols, the information is thus separated into groups of non-standard lengths. The nature and arrangement of the information which may be stored, may be widely varied. In the present instance, however, by way of example, consider only that each large information grouping includes a portion which constitutes an information key, that the groupings are placed in an ordered sequence according to their keys, and that the termination of each key is recognizable in some fashion, as by a special symbol. Each of the tape stations 10 may have a seven channel input and a seven channel output (for a seven digit, binary code), (Fig. 1A) and single pulse inputs for pulse signals which start the tape forward, start the tape in reverse, and stop the tape. The tape stations include also the necessary drive, recording, and reproducing equipment.

Input information for the system may be provided from any one of a number of input devices employed in modern data-processing equipment. The input device 12 legended as "character signal generator" may be a combination tape perforator and tape reader. As a simple example of operation of the generator 12, an operator may prepare a written information sample and insert the sample into the system at a desired time, or may impress keys which cause insertion of a sample into the system. The character signal generator 12 provides a "busy" signal (such as a light) to the operator when an operation is commenced and as long as it is continued. The generator 12 also provides a "free" signal when an operation has been completed and a new problem is not provided. The input information sample may be more or less than a message, but in any event here includes an information key which corresponds to one of the information keys in the stored groupings in the tape stations 10. This input information sample thus includes an interrogating key which is to be used to find the desired key in the tape stations. The character signal generator 12 is an asynchronous means for providing input information. That is, the rate at which character signals are entered is independent of the rate of operation of the remainder of the system.

The tape stations 10 are selectively coupled through a switching center 14 to an information sorter 16. The input character signal generator 12 output is also coupled to the sorter 16. A binary input applied to the switching center 14, from addressing circuits 100 to be more fully described hereinafter, controls the coupling of a predetermined one of the tape stations 10 to the sorter 16. Because electro-mechanical switching centers are employed elsewhere for similar operations, for example, in telephony, the switching center is not set out in detail.

The sorter 16 operates upon the information derived from the tape to select the grouping of information containing a key corresponding to the input key. One suitable sorter, for example, is shown and described in a copending application for patent filed by W. R. Ayres and J. N. Smith, entitled "Information Handling System," filed July 1, 1954, Serial No. 440,646, and assigned to the assignee of the present invention. The operation involved here is similar to the operation described in that specification as "Extract by Class." In the extract by class operation the sorter extracts from a sequence of information all groupings which fall within a designated class. Here the sorter need extract only a single grouping corresponding to a given key. In normal operation the sorter as described in the above-identified application of Ayres and Smith derives information from two input tapes and supplies information to two output tapes. Here, inputs may be coupled to the sorter 16 (at the "data selectors"—not shown—of the sorter) from the switching center 14 and the character signal generator 12. Outputs may be supplied through the switching center 14 to the selected tape station 10 and also directly to an output device 18, such as an output printer or a separate output tape station. For the purposes of this example, assume that the sorter 16 is used to order and insert the information at the tape stations 10, but that during an interrogation process information is placed in the output device 18.

As described in the above-identified application, the sorter 16 provides an "operation complete" signal (to indicate that the desired operation has been performed); and also start and stop signals for the various tape stations. Here the operation complete signal is employed as an "extraction complete signal" and is used in a fashion to be later described. Start tape forward, start tape reverse, and stop tape signals may be supplied to any of the tape stations 10 through the switching center 14.

A number of "and" gates, "or" circuits, bistable multivibrators, and delay lines are employed in this system. These elements are well known in the computing art and therefore will not be set out in detail. The function of an "and" gate is to provide an output on the coincidence of signals on all of a plurality of inputs. An "or" circuit provides an output on the occurrence of signals on any one or more of a plurality of inputs. Bistable multivibrators comprise two sections and have two stable conditions of operation. One section of each multivibrator has a reset input terminal R and a "0" output terminal, and the other section has a set input terminal S and a "1" output terminal. The multivibrator has two stable conditions of operation. In one (reset) condition of operation the multivibrator provides a "0" output or high output level on the "0" output terminal. This condition is assumed in response to a pulse input at reset terminal R. In the other condition of operation (set condition) the multivibrator provides a "1" output. The set condition is assumed in response to a pulse input at a set terminal S. A "0" output may be regarded as the normal starting condition of operation. Delay lines (real or simulated) perform the function of retarding the passage of pulses or other signals for predetermined periods of time.

For the purpose of simplifying the description, conventional amplifying and pulse shaping circuits have not been included. Further, the use of a common "ground" return throughout the system is to be understood although not shown.

The seven parallel signal channels which comprise the output of the character signal generator 12 are also directed to three control circuits 20, 30, 50 (Fig. 1B). The three control circuits have been termed respectively the start control 20, the shift advance control 30, and the shift stop control 50.

The start control circuit 20 includes a recognition gate 23 and an input "or" circuit 24 each responsive to the output of the character signal generator 12 (Fig. 1A). A recognition gate detects the occurrence of a predetermined character or characters in coded information. A suitable recognition gate 23 (Fig. 1B) for employment with an alpha-numeric code is shown and described in Patent No. 2,648,829, entitled "Code Recognition System." The recognition gate 23 generates a signal at the termination of each input key by detecting the special symbol occurring at the termination of each input key. Other termination recognition devices may be employed if other coding schemes are used. For example, if each interrogating key is of a standard instead of a variable length a counter might be employed.

The output of the input "or" circuit 24 is coupled to the set input S of a start multivibrator 25 in the start control circuit 20. Extraction complete signals are applied to the reset input of the start multivibrator 25 from the sorter 16 (Fig. 1A). The "1" output of the start multivibrator 25 (Fig. 1B) activates ("primes") one input of a three-input start "and" gate 26 and also activates the "busy" input of the character signal generator 12 (Fig. 1A). "0" output from the start multivibrator 25 (Fig. 1B) activates the "free" input of the character signal generator 12 (Fig. 1A). The output of the start "and" gate 26 and the output of the recognition gate 23 (Fig. 1B) are each applied to difficult inputs of a first "or" circuit 27 in the shaft control circuit 20.

The output of the first "or" circuit 27 is coupled to the set input (S) of an advance multivibrator 32 in the shift advance control circuit 30. The "1" output of the advance multivibrator 32 primes one input of a three input advance "and" gate 34. A second "or" circuit 36 having a plurality of inputs each responsive to a different output of the character signal generator 12 (Fig. 1A) primes one input of a two-input, third "or" circuit 38 (Fig. 1B) in the shift advance control circuit 30. The other input of the third "or" circuit 38 is coupled to the output of the advance "and" gate 34. The third "or" circuit 38 in turn activates the advance input of a multivibrator shift register 42 through a first delay line 40. The multivibrator shift register 42 carries out a number of different operations, as follows:

(1) The shift register 42 stores a predetermined maximum number of multi-digit binary characters at successive storage positions.

(2) The shift register 42 advances the stored characters one position in response to an advance pulse and recirculates a character stored in the last position back to the first position.

(3) The shift register 42 provides steady state outputs (that is static) outputs corresponding to the character stored at the final, or highest, storage position; and is said to staticize this character.

(4) All characters stored in the shift register 42 may be erased by the application of a reset pulse.

Such cyclic or circulating storage means as the shift register 42 are known in the art. One suitable type (called a shifting register) is shown and described at page 299 of the book "High Speed Computing Devices," written by the staff of Engineering Research Associates, and published by the McGraw-Hill Book Company, Inc. (1950). Binary digits may be stored, as there shown, in the successive multivibrators of a chain. The digits may also be advanced and recirculated in response to control pulses. Note that the pulse for advancing, which are here called advance pulses, are there termed reset pulses. Pulses for clearing the register of all settings, which are here called reset pulses, are pulses applied to the reset input of each multivibrator so that all the multivibrators provide "0" outputs. These reset pulses must be of sufficient duration to blank out any undesired carry pulses between the stages of the shift register. In the present system, the shift register 42 may consist of seven parallel arrangements, each having provision for storing and shifting a fixed maximum number (say 32) of binary digits. The term "parallel" is used here to indicate that signals from separate sources are directed through separate, like, channels to separate outputs, not that a signal from an individual source is directed to a number of points. The capacity of the shift register 42 is therefore thirty-two alpha-numeric characters. Inputs are applied to the shift register 42 directly from the outputs of the character signal generator 12 (Fig. 1A).

Outputs of the shift register 42 (Fig. 1B) are directed to a fourth "or" circuit 44 in the shift advance control circuit 30. The output of the fourth "or" circuit 44 is coupled to one input of a three input stop "and" gate 52 in the shift stop control circuit 50. Stop "and" gate 52 outputs are applied to the set input of a stop multivibrator 54. The "0" outputs of the stop multivibrator 54 in turn prime a second input of the stop "and" gate 52 through a second delay line 56. Stop "and" gate 52 outputs are also applied to the reset input of a restart multivibrator 58 and to one input of a sixth "or" circuit 60. Within the shift stop control circuit 50 also, the "1" output of the stop multivibrator 54 is coupled to one input of a two input restart "and" gate 62. Outputs from the restart "and" gate 62 are applied through a fifth "or" circuit 64 to the set input of the restart multivibrator 58.

The connections between the various units of the control circuits 20, 30, 50, and between the units of the control circuits 20, 30, 50 and the other parts of the system, are described below. The system also includes a message comparator 80 and addressing circuits 100 (Fig. 1A) for the switching center 14. Each output of the shift register 42 (Fig. 1B) is coupled through a different "and" gate 71 to 77 to an input of the message comparator 80. Each of the "and" gates 71 to 77 also has one input responsive to outputs from the third "or" circuit 38. These last-mentioned "and" gates are essentially in a parallel arrangement and are referred to as shift register "and" gates 70. The outputs of the shift register "and" gates 70 may provide different signal combinations representing different alpha-numeric characters. These signal combinations are staticized and compared with other signal combinations on separate inputs, similarly staticized within the message comparator 80. In overall operation the message comparator 80 determines which of two groupings of information, such as two names, should take precedence in a listing. A suitable message comparator 80 is shown and described in a copending application for patent filed November 27, 1953, by William R. Ayres and Joel N. Smith, entitled "Message Comparator," Serial No. 394,693.

A timed operation of the message comparator 80 is desired. To effect this timed operation a character comparator of the type described in copending application Serial No. 375,869, entitled "Electronic Comparator," filed August 24, 1953, by Philip Cheilik may be employed in the message comparator 80. The message comparator 80 has two outputs, on one of which it provides a "greater than or equal to" signal, and on the other of which it provides a "less than" signal. The "less than" output is coupled within the shift stop control 50 to (1) the reset input of the stop multivibrator 54, (2) an input of the fifth "or" circuit 64, and (3) an input of the sixth "or" circuit 60. The "less than" signal is also applied within the shift advance control circuit 30 to the reset input of the shift register 42. The message compartor 80 also includes a start input and a reset input. Signals applied to the start input set the compartor 80 for the commencement of a comparison operation, and signals applied to the reset input reset staticizers within the comparator 80 to receive new characters.

Connections between the various control circuits 20, 30, 50 will now be described. The "1" output of the stop multivibrator 54 primes one input of each of the different shift register "and" gates 70, and also one input of the start "and" gate 26. The "1" output of the restart multivibrator 58 is coupled through a third delay line 46 to an input of the advance "and" gate 34. The output of the sixth "or" circuit 60 is coupled to the reset input of the advance multivibrator 32.

The addressing circuits 100 (Fig. 1A) are coupled to both the switching center 14 and the message comparator 80 (Fig. 1B). The addressing circuits 100 (Fig. 1A) employ a magnetic drum 102, together with accompanying reading heads and amplifiers 104 and writing heads and amplifiers 106. Magnetic drums and magnetic drum recording and reproducing circuits are known and therefore are not here described in detail. The magnetic drum 102 and write and read circuits 104, 106 include provision for a timing track and an index pulse track, together with a number of parallel information tracks. In accordance with well known drum recording techniques, and through the use of drum write circuits 108 characters consisting of digits disposed in lines on the drum may be placed sequentially around the drum at predetermined lines. The information which is placed on the drum 102 is a sequence of keys from the tape stations 10. The keys which are selected, and which are placed in order on the drum, are the keys from the first information grouping at each tape station 10. Each key is allotted a predetermined spacing, equal in number of character positions to the number of characters which may be stored in the shift register 42 (Fig. 1B). The first key is recorded starting from the point of the index pulse, the second key is recorded starting the predetermined distance following, and so on. Unused space following the termination of each key and before the commencement of the next key may be simply left blank. Thus there are a number of incrementally spaced classifying information groupings about the drum 102 (Figs. 1A).

The magnetic drum 102 may be termed a synchronous storage because of the cyclical and timed relation of the information derived from it. The timing track and index pulses from the drum 102 are also used for controlling timing throughout the system. The timing track read head is coupled to a timing pulse generator 110 comprising a pulse shaper 112 and a series of delay lines 114, 116, 118, 120. By the use of taps taken between each successive pair of delay lines 114 to 120 each timing pulse TP from the drum 102 is followed in time by a series of other timing pulses $tp_1$ to $tp_4$. The pulses $tp_1$ to $tp_4$ occur on different conductors, and are applied to points similarly designated within the system. Specifically, $tp_2$ and $tp_3$ are applied to the timing and reset inputs respectively of the message comparator 80 (Fig. 1B). $tp_3$ is also applied to a second input of the three input stop "and" gate 52, and $tp_4$ is applied to the second input of the two input restart "and" gate 62.

For each of the previously mentioned parallel information channels on the magnetic drum 102 (Fig. 1A) there is an individual read head and amplifier arrangement. Each of these arrangements is coupled to a different one of a set of four input "and" gates 83 to 87 (Fig. 1B) which may be called the magnetic drum "and" gates 82. The outputs of the magnetic drum "and" gates 82 are applied in parallel to the remaining set of signal inputs of the message comparator 80. Another input of each of the magnetic drum "and" gates 82 is responsive to "1" outputs from the stop multivibrator 54, and a third input of each is responsive to "1" outputs from the start multivibrator 25.

Within the addressing circuits 100 (Fig. 1A) are a pair of multivibrators 128, 130, termed the stop counter multivibrator 128 and the start counter multivibrator 130 respectively. "Less than" signals from the message comparator 80 (Fig. 1B) are applied to the reset inputs R of both counter multivibrators 128, 130 (Fig. 1A). "Greater than or equal to" signals are applied to the set input S of the start counter multivibrator 130 from the message comparator 80 (Fig. 1B). The set input S of the stop counter multivibrator 128 (Fig. 1A) is responsive to index pulses from the magnetic drum 102, and the "1" output of the stop counter multivibrator 128 is used to prime the remaining input of each of the magnetic drum "and" gates 82 (Fig. 1B).

Pulses from the timing track on the magnetic drum 102 (Fig. 1A) are also applied to the trigger input of a predetermined "n" counter 132. The counter 132 provides an output on receiving a fixed number of trigger input signals. A fixed number of spaces "n" is allotted to each key stored on the drum 102. ("n" is also the number of characters which may be stored in the shift register 42 (Fig. 1B). The predetermined "n" counter 132 (Fig. 1A) also has a reset input R to which index pulse signals are applied from the magnetic drum 102 to place the counter 132 in a starting condition, with all stages in the reset condition.

The output of the predetermined "n" counter 132 is directed through a fourth delay 134 to one input of a two input counter "and" gate 136 and also to the start input at the message comparator 80 (Fig. 1B). The remaining input of the counter "and" gate 136 (Fig. 1A) is responsive to the "1" output of the start counter multivibrator 130. The output of the counter "and" gate 136 activates the trigger input of an address counter 138, which counter 138 staticizes in binary form the number of trigger inputs applied to it. The outputs of the address counter 138 comprise six parallel channels, so that sixty-four binary combinations, identified by the decimal numbers from 0 to 63 inclusive, are possible. Each of these combinations may correspond to one tape station 10, although the number is merely an illustration of one arrangement which may be employed. The address counter 138 also has a reset input R, responsive to index pulses from the magnetic drum 102.

Each output channel of the address counter 138 is coupled to a different one of a group of six parallel two-input "and" gates 141 to 146, termed the addressing "and" gates 140. The remaining inputs of the addressing "and" gates 140 are coupled to the "0" output of the start counter multivibrator 130. The outputs of the addressing "and" gates 140 are coupled to the binary signal input of the switching center 14 to provide the binary addressing signals for the switching center 14.

Index pulses from the magnetic drum 102 (Fig. 1A) of the addressing circuits 100 are applied to a third input of the start "and" gate 26 (Fig. 1B) of the start control circuits 20. The timing pulses from the magnetic drum 102 (Fig. 1A) of the addressing circuits 100 are applied through a fifth delay line 48 (Fig. 1B) to the third input of the advance "and" gate 34 of the shift advance control circuit 30.

OPERATION OF THE SYSTEM

General

It has previously been explained how the tape stations 10 (Fig. 1A) each store a sequence of groupings of information in an order determined by a key segment within each grouping. It has further been explained that the keys may be kept in an ascending order and that the sequence is a continuous one from tape station to tape station. From this library of information one desires to select a particular grouping, knowing only the key, and to derive or select from the remainder of information in the grouping.

The first key from each of the tape stations 10 is recorded on the magnetic drum 102. Each key is allotted a predetermined number ($n$) of recording positions. The keys are recorded in order on the drum starting at the indexing point. Without an interrogating key in the system the drum 102 may be read continually but no effective operation occurs. As will be apparent from what follows, the termination of the last previous interrogation operation has shut down the system to await a new interrogation. During this time a "free" signal (visual indication to the operator) may be provided at the character signal generator 12. An operator then prepares an interrogating key in the same form as the stored keys, with the desired termination symbol or combination at the end. For example, if names are employed as the key the interrogation key may consist of the following:

●Jones●John●A*

(where ● denotes an item separator symbol and * an end message symbol). The coded character signals for the above message may then be read successively, providing input for the system.

Entry of an interrogation

As the key prepared at the character signal generator 12 is read off, the characters in the key are individually stored in the appropriate register (not shown) in the sorter 16. The first character also, through the input "or" circuit 24 (Fig. 1B), provides a set input signal to the start multivibrator 25, the "1" output of which now activates the "busy" indicator on the input character signal generator 12 (Fig. 1A). The character signals are also directed to the shift register 42 (Fig. 1B). At the beginning of input the shift register 42 is cleared of previous characters, a reset pulse having been applied during the last interrogation operation. Each character signal combination also provides a single signal through the second "or" circuit 36, the third "or" circuit 38, and the first delay line 40 to the advance input of the shift register 42. The delay is sufficient to allow the shift register 42 to assume a stable operation following the entry of the character signal combination. Each character is thus set into the shift register 42 and then, together with all previously stored characters, shifted one position in the shift register 42. On reaching the last character of the message the first phase of the entry of the interrogation is complete.

The last character of each message, however, is, in this example, an end message symbol, and this symbol is used to control the second phase of the entry operation. The second phase is the proper positioning of the interrogation key in the shift register 42. Up to this point in time, the shift register 42 and associated circuitry have provided a buffering action between the asynchronously supplied input information and the system. The recognition gate 23 detects the occurrence of the end message symbol and provides an output through the first "or" circuit 27 to the set input of the advance multivibrator 32 in the shift advance control 30. The "1" output signal then provided by the advance multivibrator 32 primes one input of the advance "and" gate 34, which in turn enables the shifting and positioning to be carried out.

These second phase operations are dependent upon the proper setting of the various units in the shift stop control 50 after the last interrogation. When the last previous interrogation has been finished, the stop multivibrator 54 of the shift stop control 50 provides a "0" output signal, the restart multivibrator 58 provides a "1" output, and the advance multivibrator 32 in the shift advance control 30 provides a "0" output. When the terminating signal has been detected, therefore, two of the three inputs of the advance "and" gate 34 are primed, one by the advance multivibrator 32 and the other by the restart multivibrator 58. The remaining input of the advance "and" gate 34 is responsive, through the fifth delay line 48, to timing signals from the magnetic drum 102 (Fig. 1A). Accordingly, after the occurrence of the terminating signal, each timing signal directed to the advance "and" gate 34 (Fig. 1B) provides an output from that gate 34. The advance "and" gate 34 outputs are directed through the third "or" circuit 38 and the first delay line 40 to the advance input of the shift register 42, causing the stored characters in the shift register 42 to be shifted one position for each timing pulse.

The shifting continues until the first stored character has reached the head end position of the shift register 42. The character signal combination staticized at the head end position of the shift register 42 provides an output through the fourth "or" circuit 44 to prime one input of the three input stop "and" gate 52 of the shift stop control 50. Another input of the stop "and" gate 52 is already primed, at this point in time, by the "0" output of the stop multivibrator 54. The stop "and" gate 52 is therefore fully primed to provide an output on the occurrence of a $tp_3$ signal at its remaining input.

The function of the $tp_1$ to $tp_4$ signals generated at the timing pulse generator 110 (Fig. 1A) is to provide an orderly sequence of operations between the successive timing pulses (TP) from the magnetic drum 102. If the time duration between timing pulses (TP) is 25 μsec., for example, the time duration between the first TP and $tp_1$, and between successive $tp$ signals, may be 5 μsec. Therefore, $tp_3$ is applied to the stop "and" gate 52 (Fig. 1B) after the first character in the interrogating key has reached the head end position of the shift register 42, but before the occurrence of the next timing pulse (TP) from the magnetic drum 102 (Fig. 1A). The stop "and" gate 52 (Fig. 1B), thus provides an output which is applied to the reset input of the restart multivibrator 58 and, through the sixth "or" circuit 60, to the reset input of the advance multivibrator 32. The advance multivibrator 32 thus provides, at this time, a "0" output, disabling the advance "and" gate 34 and preventing the application of further advance pulses to the shift register 42 during the positioning phase of the entry operation. The restart multivibrator 58 also briefly provides a "0" output.

The stop multivibrator 54, however, receives a set impulse from the stop "and" gate 52 output, and is thus placed in a "1" condition. The "1" output of the stop multivibrator 54 conditions the system for the next phase of operation, which is the synchronous comparison of the shift register 42 and magnetic drum 102 (Fig. 1A) information. One input of each of the shift register "and" gates 70 (Fig. 1B) is primed; one input of each of the magnetic drum "and" gates 82 is primed; the restart "and" gate 62 is primed; and one input of the start "and" gate 26 is primed. Each comparison cycle is begun with the index pulse from the magnetic drum 102 (Fig. 1A), so that comparisons may proceed in an orderly fashion. Timing pulses therefore cannot pass the disabled advance "and" gate 34 (Fig. 1B) until the occurrence of the next index pulse. The next index pulse applied to the start "and" gate 26 finds that gate fully primed (by the start multivibrator 25 as well as the stop multivibrator 54). The start "and" gate 26 therefore provides an output through the first "or" circuit 27 to the set input of the advance multivibrator 32. A "1" output is thus again provided from the advance multivibrator 32, again fully priming the advance "and" gate 34. The timing pulse which is read at the magnetic drum 102 (Fig. 1A) simultaneously with the index pulse, and which is delayed briefly in the fifth delay 48 (Fig. 1B), thus provides an output from the advance "and" gate 34.

Outputs from the advance "and" gate 34 are now employed to effect a reading of the shift register 42 which is synchronous with the reading of the first key on the drum 102 (Fig. 1A). In addition, the various control circuits 20, 30, 50 (Fig. 1B) provide a timed presentation of information to the message comparator 80.

*Comparison of shift register and drum information*

At this point in time each of the shift register "and" gates 70 is primed by the "1" output of the stop multivibrator 54. In addition, certain of the shift register "and" gates 70 (depending upon the character) are also primed by the multivibrators (not shown) in the head end position of the shift register 42. The fully primed shift register "and" gates 70 are therefore in condition to provide outputs on the application of inputs from the advance "and" gate 34 through the third "or" circuit 38. The magnetic drum "and" gates 82 are also fully primed, because inputs are applied to them from: (1) the "1" output of the stop counter multivibrator 128 (Fig. 1A) (which is set by each index pulse), (2) the "1" output of the stop multivibrator 54 (Fig. 1B), and (3) the "1" output of the start multivibrator 25. Digital signals from the read heads 104 (Fig. 1A) on the drum 102 therefore provide outputs, representing the stored character signal combination, from the magnetic drum "and" gates 82 (Fig. 1B).

Thus, with the input key properly positioned in the shift register 42 and the first key available at the magnetic drum 102 (Fig. 1A), a timed sequence occurs in which two sets of character signal combinations are provided to the message comparator 80 (Fig. 1B). At the reading of the first character on the drum 102 (Fig. 1A) the magnetic drum "and" gates 82 (Fig. 1B) provide one set of inputs to the message comparator 80. The timing pulse TP occurring at the same time is delayed slightly in the fifth delay line 48 before passing through the advance "and" gate 34 and the third "or" circuit 38 to the shift register "and" gates 70, which provide the other set of inputs to the message comparator 80. The output of the third "or" circuit 38 is delayed sufficiently in the first delay 40 to give the shift register "and" gates 70 time to provide a full pulse output, then activates the advance input of the shift register 42. The advance signal shifts all characters one storage position in the shift register 42 and recirculates the character formerly stored in the head end position to the first storage position.

The two sets of character signal combinations applied to the message comparator 80 need only be pulses, because the inputs set staticizers (not shown) which retain the signal combinations for the individual character comparison. $tp_2$ (generated by the timing pulse generator 110 (Fig. 1A)) now occurs after the staticizers (not shown) have been set and activates the character comparator (not shown) to commence the message comparison operation. The subsequent $tp_3$ signal is also applied to the message comparator 80 (Fig. 1B), to reset the staticizers (not shown) in preparation for the insertion of the next pair of characters to be compared.

Note that with the characters in the shift register 42 advanced one position and the staticizers (not shown) reset, the system is now ready to apply the second character from the key on the drum 102 (Fig. 1A) and the second character from the input key to the message comparator 80 (Fig. 1B). The timed sequence occurs in the same fashion for each subsequent pair of characters. Starting with the most significant characters the message comparator 80 operates upon each successive pair of characters presented to it. At the conclusion of the pair of messages or before, the message comparator 80 determines the relationship of the messages and which of the two should take precedence. In a typical case in which the desired information grouping is not in the first of the group of tape stations 10 (Fig. 1A) the message comparator 80 (Fig. 1B) will provide a "greater than or equal to" signal. The "greater than or equal to" signal indicates that the input key is greater than the first key stored on the drum 102 (Fig. 1A). The effect of this decision will be described more completely in conjunction with the addressing circuits 100. The decision does mean, however, that the comparisons are to continue.

It has already been stated that the shift register 42 (Fig. 1B) information is recirculated, and that stored characters are advanced one position on the occurrence of each timing pulse. Due to the fact that the number of character positions in the shift register 42 is equal to the number of character spaces allotted each stored information key on the drum 102 (Fig. 1A), the input key is read synchronously with the next key stored on the drum 102. That is, the most significant character of the input key has again been circulated to the head end position of the shift register 42 (Fig. 1B) when the most significant character of the next stored key is available at the drum reading heads 104 (Fig. 1A). Accordingly, as long as "greater than or equal to" signals are obtained from the message comparisons, the system proceeds on to the comparison of the input key with the next stored information key on the drum 102. The provision of a "less than" output from the message comparator 80 (Fig. 1B) initiates a cycle in the control circuits 20, 30, 50 and addressing circuits 100 (Fig. 1A) which effects selection of the proper tape station 10. Note that the message comparator 80 (Fig. 1B) is placed in a starting condition by start signals applied from the predetermined "n" counter 132 (Fig. 1A) in the addressing circuits 100. As will be apparent later, these start signals are provided immediately following each stored information key on the drum 102.

*Selection of tape station, extraction of information, and termination of interrogation*

The addressing circuits 100 operate upon the signals received from the message comparator 80 (Fig. 1B) and the magnetic drum 102 (Fig. 1A) to set up a binary signal combination which controls the tape station 10 to be coupled to the information sorter 16. "Greater than or equal to" signals from the message comparator 80 (Fig. 1B) are applied only to the set input of the start counter multivibrator 130 (Fig. 1A). "Greater than or equal to" signals therefore provide a "1" output from the start counter multivibrator 130 which primes the counter "and" gate 136. A signal path is then open between the output of the predetermined "n" counter 132 and the address counter 138 trigger input. Starting from the index point, the predetermined "n" counter 132 in effect detects the occurrence of each stored information key by counting the "n" spacings allotted to each key. As long as the message comparator 80 (Fig. 1B) signals a condition of "greater than or equal to," therefore, predetermined "n" counter 132 (Fig. 1A) outputs are directed through the fourth delay line 134 and the counter "and" gate 136 to the address counter 138. The address counter 138 staticizes in binary form the number of trigger inputs applied to it. Note that both the predetermined "n" counter 132 and the address counter 138 are reset by the index pulse, which begins the cycle of operation.

When a transition occurs from "greater than or equal to" to "less than" in the output of the comparator 80 (Fig. 1B), however, the tape station 10 (Fig. 1A) in which the desired information is stored has been located. The change in relationship indicates that the interrogating input key is less than the lowest key stored at the given tape station 10, and that the desired information cannot be found at that station. Thus, although the transition occurs when using a given key from the drum 102, the desired information is really to be found in the tape station corresponding to the immediately prior key on the drum 102. The address counter 138 at this time is staticizing the count for the prior tape station, however, and thus need only be read out without change. Accordingly, "less than" signals are used to reset the start counter multivibrator 130, providing a "0" output which disables the counter "and" gate 136. The output of the predetermined "n" counter 132, delayed in the fourth delay line 134, does not reach the counter "and" gate 136 until that gate 136 has been disabled.

The "0" output of the start counter multivibrator 130 is employed to activate an input of each of the addressing "and" gates 140. The addressing "and" gates 140 accordingly provide an output signal combination which corresponds to the binary count of the address counter 138. This signal combination controls the coupling by the switching center 14 of a specific tape station 10 to the sorter 16. As an example of the overall operation assume that the transition from "greater than or equal to" to "less than" occurs when reading the 29th out of sixty-four keys recorded on the magnetic drum 102, there being also sixty-four tape stations. The address counter 138 is then at the proper count for the 28th tape station, and this is the count which controls the coupling by the switching center 14 of the 28th tape station to the sorter 16.

Once the switching is completed at the switching center 14 the sorter 16 starts the tape, extracts the desired information grouping, and provides the desired output to the output device 18. The tape may be rewound by the sorter 16 or by automatic means separate from the sorter 16. When the extraction is complete the extraction complete signal is provided to the start multivibrator 25 (Fig. 1B) and the "free" indicator is activated at the input character signal generator 12 (Fig. 1A). Thus the system is free to begin another operation.

The "less than" signal sets up the system for the next subsequent operation in the following way:

(1) The signal resets both the start counter multivibrator 130 and the stop counter multivibrator 128 in the addressing circuits 100.

(2) The signal resets the shift register 42 (Fig. 1B), clearing all the information stored therein.

(3) The signal resets the stop multivibrator 54, the "1" output of which, after a delay in the second delay line 56 sufficient to clear the shift register 42, primes an input of the stop "and" gate 52.

(4) The signal sets the restart multivibrator 58 through the fifth "or" circuit 64 and resets the advance multivibrator 32 through the sixth "or" circuit 60.

Note that this operation creates the conditions previously referred to as existing on the commencement of an interrogation operation.

Thus there has been described a rapid and efficient system for interrogating an electronic library of information. An information sample may be placed in the system and a grouping of information corresponding to the sample selected from the library. The system provides ready access to any of a great mass of information groupings. If desired, automatic means for providing successive input requests may be used, once the input requests have been prepared.

What is claimed is:

1. A system for comparing an input information sample with stored information comprising circulating storage means having an input and an output and having means for circulating said input information sample from said output to said input, magnetic drum storage means for sequentially recording information groupings to be compared with said information sample, means for reading said input information sample as said sample is circulated by said circulating storage means synchronously with each recorded information grouping, and means for comparing said information sample and the sequentially recorded information groupings.

2. A system for comparing input messages and stored messages comprising circulating storage means of predetermined capacity responsive to said input messages, said storage means having an output and an input and means for coupling said output to said input, magnetic drum means for receiving messages of a length corresponding to said circulating storage means capacity, means responsive to said magnetic drum means to position said input messages in said circulating storage means, means to read said circulating storage means and each successive message on said magnetic drum means in synchronism, and comparing means responsive to said circulating storage means and said magnetic drum means.

3. A system for comparing an input information sample with information stored in a synchronous storage medium, said system comprising a shift register responsive to said input information, said shift register storing a predetermined maximum number of units of information and selectively recirculating said information, a magnetic drum for sequentially recording information groupings each the same in number of units as said shift register maximum number, means responsive to said magnetic drum to position said input information in said shift register, means to synchronously read said shift register and magnetic drum, and comparing means responsive to said shift register and magnetic drum for signalling the occurrence of predetermined relationships between said information sample and said information groupings.

4. In combination, a plurality of information shift register storages, in each of which information may be stored in sequence and circulated from the output to the input thereof, an information extractor, means selectively coupling any of said information storages and said information extractor, magnetic drum storage means for receiving information classifying the information in said information storages, means for selectively writing said classifying information into said drum storage means, means for providing desired input information, means to compare said desired input information and said classifying information, and means responsive to said comparing means to control said means selectively coupling said information storages and said information extractor.

5. In combination, a plurality of magnetic tape information storage stations, each of said stations including means for storing a portion of a sequence of ordered information, means to extract a given grouping of information from a sequence of information groupings, means selectively coupling any of said tape stations to said extracting means, synchronous storage means for receiving incrementally spaced classifying information groupings, a different one for each different portion of ordered information in said storage stations, means for providing desired input information, means for storing said desired input information, means to compare said desired input information with each said classifying information grouping, and means responsive to said comparing means to control said means selectively coupling said storage stations and said extracting means.

6. In combination, a plurality of magnetic tape information storage stations, each of said stations including means for storing a portion of a sequence of ordered information, means to extract a given information grouping from a sequence of information groupings, a magnetic drum for receiving incrementally spaced information keys, each of said information keys denoting the portion of information stored at a different tape station, shift register storage means, means for entering input information into said shift register storage means, means to compare said input information successively with each of said information keys, addressing means including counting means responsive to said comparing means, and means responsive to said addressing means to selectively couple said tape stations to said extracting means.

7. A system for locating a desired grouping of information in an electronic library having a plurality of tape stations, said system comprising means to provide an interrogating input key, recirculating shift register means responsive to said interrogating input key, magnetic drum means having at spaced intervals thereon successive information keys each corresponding to a different tape station, means for successively comparing said input key with said information keys on said magnetic drum means, an information sorter for extracting a desired grouping of information, and means responsive to said comparing means for selectively coupling an individual library tape station to said sorter.

8. A system for locating a desired grouping of information in an electronic library having a plurality of tape stations, said system comprising means to provide an interrogating input key, recirculating shift register means responsive to said interrogating input key, said shift register means including means to advance and means to erase said input key, means to position said input key in said shift register means, magnetic drum means having at spaced intervals thereon successive information keys each corresponding to a different tape station, means for reading said shift register means synchronously with each information key on said magnetic drum means, means for comparing said input key with each information key, an information sorter for extracting a desired grouping of information from a tape station, and means responsive to said comparing means for selectively coupling an individual library tape station to said sorter.

9. A system for selecting a desired grouping of information in an electronic library including a plurality of tape stations, the information groupings in said library each including an information key and said information groupings being arranged in a regular order according to said information keys, said system comprising means to provide an interrogating input information key, recirculating shift register means responsive to said interrogating input information key, said shift register means having a capacity for a fixed number of units of information and including means to advance and means to erase said interrogating input information key, means to position said interrogating input information key in said shift register means, magnetic drum means having at spaced intervals thereon successive information keys each classifying the information to be found at a different tape station, means for reading the interrogating input information key from said shift register means synchronously with each information key from said magnetic drum means, means for comparing said interrogating input information key with each information key on said magnetic drum means and for signalling the occurrence of a predetermined relationship between said keys, means for extracting a desired grouping of information from a tape station, and means responsive to said comparing means for selectively coupling an individual tape station to said means for extracting.

10. A system for selecting a desired grouping of information in an electronic library including a plurality of tape stations, the information groupings in said library being composed of characters grouped into items, with said items forming messages, and said information groupings each including an information key and being arranged in a regular order according to said information keys, said system comprising means to provide an interrogating input information key, a recirculating shift register responsive to said interrogating input information key, said shift register having a capacity for a fixed number of characters and including means to advance and means to erase said interrogating input information key, a magnetic drum having at spaced intervals thereon successive information keys each classifying the information to be found at a different tape station, means including gating means responsive to said magnetic drum to position said input information key in said shift register means, means including gating means and multivibrator means coupled to said shift register and said magnetic drum for reading the interrogating input information key from said shift register character for character with each information key on said magnetic drum, means for comparing said input key with each information key on said magnetic drum and for signalling the occurrence of a predetermined relationship between said keys, means including counting means responsive to said comparing means and said magnetic drum for signalling the information key with which said predetermined relationship occurs, means for extracting a desired grouping of information from a tape station, and means responsive to said signalling means for selectively coupling an individual tape station to said means for extracting.

11. A system for selecting a desired grouping of information in an electronic library including a plurality of tape stations, the information groupings in said library each including an information key and said information groupings being arranged in a regular order according to said information keys, said system comprising means to provide an interrogating input information key, a recirculating shift register responsive to said interrogating input information key, said shift register having a capacity for a fixed number of information units and including means to advance and means to erase said input information key, a magnetic drum having at spaced intervals thereon successive information keys each classifying the information to be found at a different tape station, means including gating means responsive to said magnetic drum to advance said interrogating input information key in said shift register, means including gating means responsive to said shift register for placing said interrogating input information key in a predetermined position in said shift register, means including gating means for reading the interrogating input information key from said shift register synchronously with each information key on said magnetic drum, means comparing said interrogating input information key with each information key on said magnetic drum for signalling the occurrence of a predetermined relationship between said keys, a first counter responsive to information keys on said magnetic drum for detecting the occurrence of each information key on said magnetic drum, a second counter responsive to said first counter and said signalling means for providing address signals, means for extracting a desired grouping of information from a tape station, and switching means responsive to said second counter for selectively coupling an individual tape station to said means for extracting.

References Cited in the file of this patent

UNITED STATES PATENTS

| 2,124,906 | Bryce | July 23, 1938 |
| 2,587,532 | Schmidt | Feb. 26, 1952 |
| 2,597,866 | Gridley | May 27, 1952 |
| 2,721,990 | McNaney | Oct. 25, 1955 |
| 2,770,797 | Hamilton | Nov. 13, 1956 |

OTHER REFERENCES

Publication entitled: "Magnetic Drum Storage for Digital Information Processing Systems," by Cannon, in Mathematical Tables and Other Aids to Computation, published by the National Research Council, January 1950 (pages 34–37).